Jan. 14, 1930.  F. J. HAFFNER  1,743,210
ADJUSTABLE SEAT BASE
Filed April 24, 1928
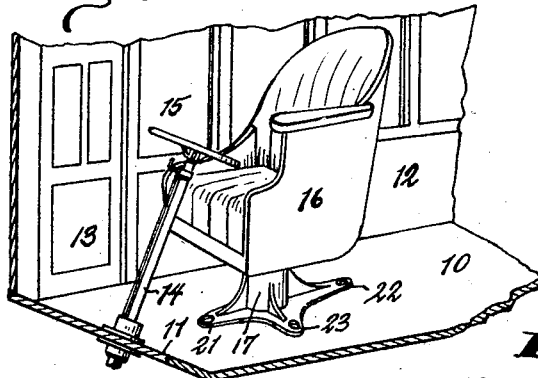
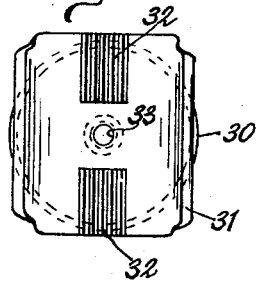
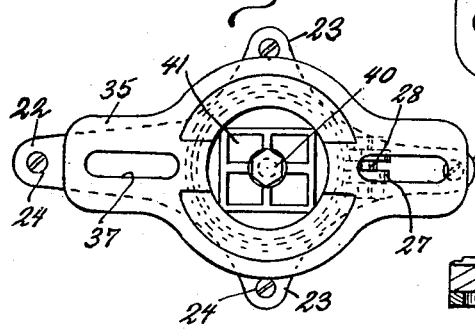
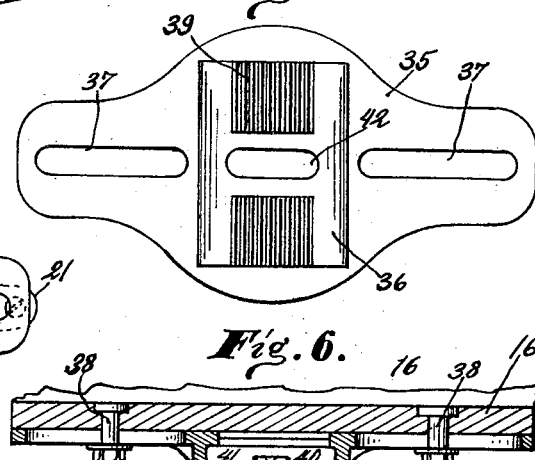
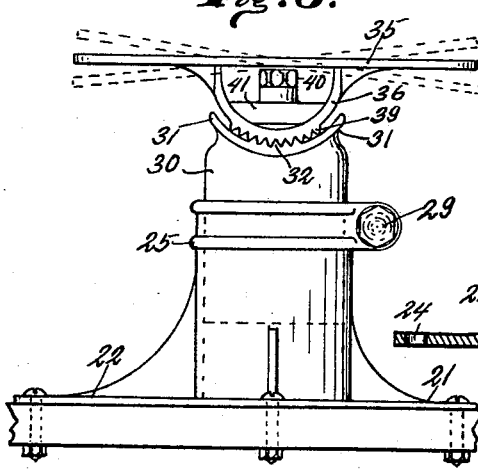
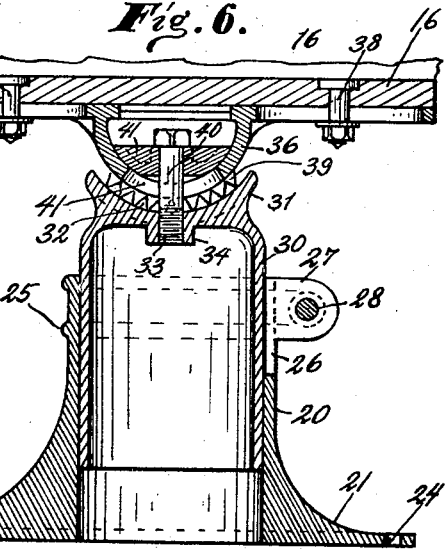
Inventor.
Fred J. Haffner.
by
Lockwood & Lockwood,
His Attorneys.

Patented Jan. 14, 1930

1,743,210

UNITED STATES PATENT OFFICE

FRED J. HAFFNER, OF LOS ANGELES, CALIFORNIA, ASSIGNOR TO OLIVE R. FULLER, OF LOS ANGELES, CALIFORNIA

ADJUSTABLE SEAT BASE

Application filed April 24, 1928. Serial No. 272,388.

The object of this invention is to provide an absolutely strong and durable bus driver's seat base which is also capable of the adjustments necessary to accommodate and adapt it to a great variety of bus drivers. The space between the seat and the steering shaft of the wheel is so small and the parts are so fixedly mounted and unchangeable in position relatively that the seat must be adjusted to suit the particular driver.

Prior to this invention the bus driver's seats caused endless trouble and complaint because the seats have been rigidly mounted and constructed, and, while pains were taken to make the seat satisfactory, it was satisfactory only for one person, or persons of one shape and size. Drivers of buses change frequently, every day and usually three or four times every day, and some are very tall or thin or long legged or long armed relatively, and some are very short and fleshy, so that one fixed construction of bus driver's seat would not enable more than one size and shape of driver to comfortably and safely drive his bus.

If the driver's seat is not comfortable for a driver, the efficiency of his service is greatly reduced and the element of danger enhanced, because he is hampered to such an extent that he is not free to handle himself and the bus properly.

With this invention the driver's seat is adjustable in various ways to accommodate any variety and shape of driver, and it can be readily adapted for any driver, and when so adjusted the seat will be comfortable for any driver, and in such relation to the steering shaft and wheel as to enable the driver to freely and fully perform his duty without any handicap or interference, whereby the service the driver renders is greatly enhanced and the freedom of movement enables him to drive not only more easily but more safely, for the advantage of himself and the protection of the bus and passengers.

Prior to this invention bus drivers were always complaining of their seat, whereas with this new adjustable seat construction all complaints by the bus drivers have been avoided and prevented. While this invention has been made and used particularly in relation to bus drivers' seats, it is not necessarily limited to such use.

The full nature of the invention will be understood from the accompanying drawings and the following description and claims:

In the drawings:

Fig. 1 is a perspective view of a bus driver's seat, the steering wheel and shaft and a portion of the interior of a bus in which the same are mounted, parts being broken away. Fig. 2 is a plan view of the seat base as an entirety. Fig. 3 is a side elevation of the same, with adjusted tiltable positions of the seat supporting frame indicated by full and dotted lines. Fig. 4 is a plan view of the head of the telescoping cylinder. Fig. 5 is a bottom view of the frame on which the seat is mounted. Fig. 6 is a vertical central section through the seat base and the lower part of the seat, parts of the latter being broken away.

There is shown in Fig. 1 part of a bus, including the floor 10, inclined foot board 11, side wall 12 and door 13, and a steering shaft 14 mounted in the inclined foot board 11, as usual, and a steering wheel 15 on the upper end thereof. There is also shown in Fig. 1 a bus driver's seat 16, and a stand 17 for the base on which the seat is mounted, so as to be convertible, convenient and adjustable with relation to the steering wheel shaft and the inclined foot board to accommodate different drivers.

The base or pedestal on which the driver's seat is mounted and which constitutes this invention, appears in Fig. 6 and includes the following parts and members. A cylindrical tubular shaft 20 is secured vertically on the floor 10 of the bus. The base of this stand has a forwardly extending foot 21 and a longer rearwardly extending foot 22 and shorter laterally extending feet 23. These feet are provided with holes 24 to receive means for firmly securing said stand 20 to the floor of the bus. Said stand is bored with a uniform internal diameter from top to bottom and has near its upper end preferably two external beads 25, and the upper end of the stand, including the beaded portion, has a vertical slit 26 in it, as shown in Fig. 6, and integral with the stand there is a pair of ears 27, one ear on each side of said slit, and both ears are provided with holes 28 in alinement with each other, and the hole in one ear is threaded to receive a locking bolt 29 for the purpose hereafter stated.

The base or pedestal of the driver's seat includes also a tubular member 30, which is preferably truly cylindrical and adapted to fit rather snugly in said tubular stand. The interior surface of the stand 20 and the interior surface of the cylinder 30 are preferably made smooth so that the tubular member 30 is readily adjustable, both vertically and angularly, in the stand 20. When the tubular member 30 is so adjusted, it is locked in its adjusted position by turning the bolt 29 so as to draw the two clamping ears 27 towards each other and bind the upper part of the stand 20 tightly around the cylinder 30. The metal of which the stand 20 is made is such as permits the said clamping action and also permits the release of the cylinder 30 when the bolt 29 is turned backward to enable the cylinder 30 to be readjusted or removed.

The tubular member or cylinder 30 has a head 31 on the upper end thereof with an upper surface concave from front to rear as shown in Figs. 3 and 6, and laterally straight, and said concave surface is provided with two series of transverse serrations 32, as shown in Fig. 4, arranged one at each side of a central vertical hole 33 in said head, which extends through a central thickened portion 34 of said head, as shown in Fig. 6. The head 31 is preferably integral with the tubular member 30. A frame 35 is provided at the upper end of the seat base for mounting the seat 16 thereon, as shown in Figs. 2 and 6. Fig. 5 is a bottom view of this frame.

The major portion of the frame 35 is substantially in the form of a plate, as seen in Fig. 5, which has two longitudinal slots 37 in it, one at the front and one at the rear in alinement with each other and through which bolts 38 may extend for securing the seat on the frame. These bolts are so distanced with reference to each other that they enable the seat to be adjusted backwardly and forwardly considerably. Thus the bolts 38 can be both simultaneously at the rear ends of the slots 37 or the front ends thereof.

The central portion of the frame 35 has a downwardly extending semicylindrical portion 36, having substantially the same curvature from front to rear as the upper surface of the head 31 of the tubular member 30 below. Said member 36 extends straight laterally and has on the underside thereof a series of serrations 39, one at each lateral end thereof or from opposite sides of the center slot 41 and extending transversely so as to interengage the serrations 32 of the head 31 below and interlock the seat supporting frame 35 with the head 31 of the tubular member 30. This enables the seat 16 and the frame 35 to be tilted vertically to the desired angle for giving the proper slopes to the seat portion and back portion of the seat 16, and when adjusted the parts are locked by the bolt 40 which extends through a clamping block 41 upon the semicylindrical portion of the frame 35 and through a slot 42 in said portion 36 and screws into the hole 33 in the head 31, as shown in Fig. 6. To render the bolt accessible the upper portion of the plate 35 has a central opening, as shown in Figs. 2 and 6, and the central part of said plate is widened as shown to provide a relatively wide and strong semicylindrical portion 36.

The chair or seat is preferably rigid, that is the chair and support are rigid with relation to each other, because they are subjected to enormous strain when the bus driver is operating the bus, and it is noted that all parts of the base of the seat or chair are very strong. To that end stand 20 is made cylindrical and also tubular member 30 is cylindrical and the curved interengaging members 31 and 36 are relatively heavy and one integral with the tubular member 30 and the other integral with the seat supporting plate 35. Likewise the serrations 32 and 39 are relatively large in order to hold firmly the parts in adjusted position against enormous and varied strains to which they are subjected in use.

The device, therefore, is peculiarly constructed so as to give to it sufficient strength to withstand rough usage, and it consists of only three or four parts strongly connected and associated with each other. This construction permits of all the adjustments that may be desired or required to accommodate various bus drivers, which becomes important when considered in connection with the close relation between the bus driver's seat and the steering wheel of the bus. The driver must be comfortably seated so as to leave him free to do the work required.

Bus drivers are all practically different from each other in size and shape so that nearly every bus driver requires adjustment of the seat support in various ways. If he be tall the seat must be vertically adjusted so that it will be higher, and the seat must be also correspondingly tilted back and the device angularly turned somewhat to accommodate his long legs and long back and to make it convenient for him not only to operate the steering wheel but also to deal with passengers at his right. If he be fleshy and short the seat must be lowered, as well as turned angularly and the back tilted at a slightly different angle so as to enable him to enter and sit comfortably between the back and steering wheel. If he has long arms the seat must be adjusted rearwardly as well as otherwise, and if he has short arms the seat must be adjusted forwardly as well as otherwise. If he has a hump-back the seat must be more nearly horizontal than if he be erect. The many varieties of forms and shapes of men require all of these adjustments, and, when made, the parts must be positively locked in position so as to resist all strain, and the strain is very great because of the hard usage in steering a bus and the pressure against the back of the seat due to the inclined floor section and the use of the feet on the clutch pedal and brake pedal.

I claim as my invention:

1. An adjustable seat base including a stationary tubular stand having an upper slotted end, ears on opposite sides of the slot in said stand, a member fitting snugly in the tubular stand and adapted to be vertically and angularly adjusted, a lock bolt extending through said ears for securing said member in its adjusted position, a head rigid on the upper end of said member having its upper surfaces concave forward and backward and having serrations arranged oppositely relative to a center hole in said head and transversely, a plate upon which the seat may be secured, a semi-cylindrical member secured to and extending down from the central portion of said seat plate with the same curvature as the head of said vertically adjustable supporting member and transversely extending serrations on the underside of said plate arranged on opposite sides of a central longitudinal slot extending forwardly and rearwardly therein and arranged to engage the serrations in said head, and a headed bolt extending through the slot from said seat member and secured in the head of said vertically adjustable seat supporting member. so as to detachably secure said seat plate to said head.

2. An adjustable seat base including a stationary tubular stand having a slotted upper end, a vertical telescoping cylinder fitting snugly in the tubular stand so it may be adjusted vertically and angularly, ears integral with said stand arranged on opposite sides of the slot therein, a lock bolt extending through said ears, for clamping the cylinder in the stand when adjusted, a head rigid on the upper end of said telescoping cylinder and having its upper surface concave forwardly and backwardly and straight transversely and provided with transversely extending serrations thereon, a plate upon which the seat may be secured having at each end a longitudinal slot, clamping bolts extending through said slots for securing the said seat plate, when adjusted forwardly and backwardly, a semi-cylindrical member rigidly secured to and extending down from the central portion of said plate with the same curvature as the head of the telescoping cylinder and having transversely extending exterior serrations on the underside thereof for engaging the serrations on the head of said cylinder and having a central longitudinal slot therein, and a headed bolt extending through the slot in said plate member and screwing into said cylinder head for locking the said seat frame in its adjusted positions.

In witness whereof, I have hereunto affixed my signature.

FRED J. HAFFNER.